United States Patent
Liu (10) Patent No.: US 9,353,264 B2
(45) Date of Patent: May 31, 2016

(54) POLYMER PARTICLE, AQUEOUS DISPERSION INCLUDING THE SAME, AND FLUORORESIN COATING COMPOSITION USING THE SAME

(71) Applicants: THE CHEMOURS COMPANY FC LLC, Wilmington, DE (US); DUPONT-MITSUI FLUOROCHEMICALS COMPANY, LTD., Chiyoda-ku (JP)

(72) Inventor: Yuqing Liu, Shizuoka (JP)

(73) Assignees: THE CHEMOURS COMPANY FC, LLC, Wilmington, DE (US); DUPONT-MITSUI FLUOROCHEMICALS COMPANY, LTD., Tokyo (JP)

( * ) Notice: Subject to any disclaimer, the term of this patent is extended or adjusted under 35 U.S.C. 154(b) by 306 days.

(21) Appl. No.: 13/837,371

(22) Filed: Mar. 15, 2013

(65) Prior Publication Data
US 2013/0289175 A1  Oct. 31, 2013

(30) Foreign Application Priority Data
Apr. 27, 2012  (JP) ................................. 2012-102548

(51) Int. Cl.

| | | |
|---|---|---|
| C08L 79/08 | (2006.01) | |
| C08L 81/06 | (2006.01) | |
| C09D 167/00 | (2006.01) | |
| C08K 3/22 | (2006.01) | |
| C08J 3/07 | (2006.01) | |
| C08J 3/14 | (2006.01) | |
| C09D 127/18 | (2006.01) | |
| C09D 177/00 | (2006.01) | |
| C09D 179/08 | (2006.01) | |
| C08G 73/10 | (2006.01) | |
| C08G 73/14 | (2006.01) | |
| C08K 3/04 | (2006.01) | |
| C08K 3/30 | (2006.01) | |

(52) U.S. Cl.
CPC .............. *C08L 79/08* (2013.01); *C08G 73/1046* (2013.01); *C08G 73/14* (2013.01); *C08J 3/07* (2013.01); *C08J 3/14* (2013.01); *C08L 81/06* (2013.01); *C09D 127/18* (2013.01); *C09D 167/00* (2013.01); *C09D 177/00* (2013.01); *C09D 179/08* (2013.01); *C08J 2367/00* (2013.01); *C08J 2377/00* (2013.01); *C08J 2379/08* (2013.01); *C08J 2381/04* (2013.01); *C08J 2381/06* (2013.01); *C08K 3/04* (2013.01); *C08K 3/22* (2013.01); *C08K 2003/2227* (2013.01); *C08K 2003/2231* (2013.01); *C08K 2003/2241* (2013.01); *C08K 2003/2296* (2013.01); *C08K 2003/3045* (2013.01); *Y10T 428/2982* (2015.01)

(58) Field of Classification Search
CPC .................................. C08L 79/08; C08L 81/06
USPC ................... 524/104, 233; 428/402
See application file for complete search history.

(56) References Cited

U.S. PATENT DOCUMENTS

| | | | |
|---|---|---|---|
| 6,060,167 | A | 5/2000 | Morgan et al. |
| 6,228,932 | B1 | 5/2001 | Saito |
| 2004/0071987 | A1 | 4/2004 | Bate |
| 2004/0110011 | A1 | 6/2004 | Shah et al. |
| 2006/0292346 | A1 | 12/2006 | Hoshino |
| 2007/0112122 | A1 | 5/2007 | Stecher et al. |
| 2010/0203337 | A1 | 8/2010 | Kimura et al. |
| 2012/0034448 | A1* | 2/2012 | Liu ................................. 428/325 |

FOREIGN PATENT DOCUMENTS

| | | |
|---|---|---|
| GB | 884614 A | 12/1961 |
| JP | 11241045 A | 9/1999 |
| JP | 2000080329 A | 3/2000 |
| JP | 2010132848 A | 6/2010 |
| WO | 2011048965 A1 | 4/2011 |

OTHER PUBLICATIONS

PCT International Search Report mailed Jun. 27, 2013.

* cited by examiner

*Primary Examiner* — Ling Choi
*Assistant Examiner* — Ronald Grinsted
(74) *Attorney, Agent, or Firm* — Keith W. Palmer (57) ABSTRACT

The present invention provides a polymer particle comprising a polymer and a filler contained therein, wherein the polymer is soluble in an organic solvent and is also water insoluble, and wherein the polymer particle contains from 5 to 500 parts by weight of filler per 100 parts by weight of polymer, and a mean particle size of 75 μm or less. The invention also provides an aqueous dispersion including this particle; an aqueous fluororesin coating composition that uses this aqueous dispersion; and a fluororesin laminate or layered coating having a layer obtained from this fluororesin coating composition.

13 Claims, 5 Drawing Sheets

POLYMER PARTICLE, AQUEOUS DISPERSION INCLUDING THE SAME, AND FLUORORESIN COATING COMPOSITION USING THE SAME

The present invention relates to a polymer particle comprising a polymer and a filler contained therein, wherein the polymer is soluble in high-concentration organic solvents and is also water insoluble, and wherein the polymer particle has a mean particle size of 75 μm or less.

The present invention also relates to an aqueous dispersion that contains this polymer particle, to an aqueous fluororesin coating composition that uses this aqueous dispersion, and to a fluororesin laminate or multi-layer coating having a layer made from this fluororesin coating composition.

BACKGROUND OF INVENTION

Fluororesins are used as coatings because they have the characteristics of being chemical resistant, non-tacky, heat resistant, having a low coefficient of friction, and being electrically insulating, as well as because they can form a coating film that is free from pinholes. However, fluororesins cannot be used as a solution for coatings because they are insoluble in water and organic liquids. Therefore, these are applied to an object being coated by means such as, for example, electrostatic painting with a powder coating, or spraying, dipping, or flow coating of a dispersion, such as an organic liquid dispersion or aqueous dispersion stabilized with a surfactant, and then a coating film is formed by heat fusion treatment.

When coating various metallic substrates with fluororesins, such as PTFE, FEP, PFA, or the like, adhesion defects occur and it is very difficult to directly coat the metallic substrate with fluororesin because the non-tacky characteristics of fluororesins make adhesion to the substrate problematic. Therefore, when performing fluororesin coating, primer compositions have been developed and put into use that are adhesive toward the substrate and that are additionally adhesive to fluororesin coatings that will be applied thereover.

However, fluororesin laminates that use the primer compositions have problems in that, when repeatedly challenged by infiltration of heat, moisture, corrosives, or the like, the coating will deteriorate, developing peeling between the top coating layer and primer layer, between an intermediate coating layer and the primer layer, within the primer coating layer, or between the primer layer and the substrate material.

The applicant in this matter has previously proposed a coating composition, in which colloidal particles are contained in a melt processible fluororesin powder dispersion, as a fluororesin coating composition that does not pose an explosion hazard, and that is capable of forming a 100 to 1000 μm-thick coating film having excellent corrosion resistance and steam resistance by a single process of film formation, using a simple paint gun, or the like (Japanese Unexamined Patent Application Publication No. H11-241045 and 2000-80329). However, since this coating composition has a low concentration of colloidal particles in the dispersion used as the coating composition, large quantities of the dispersion must be used to obtain the coating composition using this dispersion of colloidal particles, and the coating composition is difficult to use due to the decreased viscosity of the coating composition. See, for example, Patent Publication: Japanese Unexamined Patent Application Publication No. H11-241045; and Patent Publication: Japanese Unexamined Patent Application Publication No. 2000-80329.

The present invention resolves the aforementioned problems, and an objective thereof is to provide a polymer particle that is non-tacky while at the same time having excellent adhesion to substrate materials and between layers, prevents peeling of the fluororesin laminate by suppressing infiltration of heat, moisture, corrosives, and the like, and that improves corrosion resistance, steam resistance, and durability.

Another object of the present invention is to provide an aqueous dispersion that contains polymer particles with the aforementioned characteristics, and a method of manufacturing the same.

Another object of the present invention is to provide an aqueous fluororesin coating composition that allows a fluororesin laminate to be formed therefrom that is non-tacky while at the same time having excellent adhesion to substrate materials and between layers, prevents peeling by suppressing infiltration of heat, moisture, corrosives, and the like, and that improves corrosion resistance, steam resistance, and durability.

SUMMARY OF INVENTION

The present invention provides a polymer particle comprising a polymer and a filler contained therein, wherein the polymer is soluble in an organic solvent and is also water insoluble, and wherein the polymer particle contains from 5 to 500 parts by weight of filler per 100 parts by weight of polymer, and a mean particle size of 75 μm or less. In an embodiment, polymer particle contains from 70 to 500 parts by weight of filler per 100 parts by weight of polymer. In an embodiment, polymer particle has a mean particle size of 30 μm or less.

In an embodiment of the present invention, the polymer in the aforementioned polymer particle is at least one selected from polyimides, polyamide imides, polyamides, polyesters, polyethylene terephthalate, polyphenylene sulfide, polysulfones, polyetherimides, and polyethersulfones. In an embodiment, the polymer in the polymer particle is polyetherimide or polyethersulfone, or a combination thereof.

In an embodiment of the present invention, the filler is an organic or inorganic particle. In an embodiment, the weight ratio of such filler particles to water insoluble polymer in the polymer particles is from 0.7:1.0 to 5.0:1.0.

In an embodiment of the present invention, the inorganic particle filler is at least one inorganic particle selected from silicon carbide, silicon oxide, aluminum oxide, zinc oxide, tin oxide, titanium dioxide, barium sulfate, and carbon black.

In an embodiment of the present invention, the organic particle filler is at least one organic particle selected from polyphenylene sulfide, polyetheretherketone, and aramid.

The present invention also provides an aqueous dispersion that contains the aforementioned polymer particle and an organic solvent in which the polymer of this polymer particle is soluble. In one such embodiment, the organic solvent in which the polymer is soluble is any one of: an acetamide, acetoacetamide, lactone, acetoacetate, pyrrolidone, guanidine, piperidone, dialkylsulfoxide, furfural, organic carbonate, phthalate, sulfolane, dione, and organic phosphate, or a mixture thereof. Preferably, the organic solvent in which the polymer is soluble is a water miscible organic solvent. Preferably, the organic solvent is at least one of dimethylacetamide, dimethylacetoacetamide or N-methyl-2-pyrrolidone.

The present invention further provides an aqueous coating composition comprising the polymer particle aqueous dispersion. In one such embodiment, the aqueous coating composition further comprises one or more fluororesin; for example, the aqueous coating composition may further comprise an aqueous dispersion of one or more fluororesin. Optionally, the aqueous coating composition may further comprise a water soluble polyamide imide or polyamic acid or salt thereof.

Accordingly, the present invention provides a fluororesin coating composition comprising the polymer particle aqueous dispersion, one or more aqueous dispersion of a fluororesin, and, optionally, one or more other component.

In an embodiment of the present invention, the aforementioned fluororesin is a homopolymer of tetrafluoroethylene; a copolymer of tetrafluoroethylene and at least one monomer selected from perfluoro (alkylvinylether), hexafluoropropylene, and ethylene; or a mixture of two or more of these.

The present invention further provides a fluororesin laminate or multi-layer coating having a layer comprising the aforementioned fluororesin coating composition. In an embodiment, the layer comprising the fluororesin coating composition is a primer layer. In one such embodiment, the primer layer additionally comprises polyamide imide or polyamic acid or salt thereof.

Embodiments of the present invention as described in the Summary of the Invention, and any other embodiments described herein, can be combined in any manner. Accordingly, the invention also includes embodiments which result from combinations of the elements described in each of the above embodiments.

The present invention also provides a method for manufacturing an aqueous dispersion comprising a polymer particle comprising a polymer and a filler contained therein, wherein the polymer is soluble in an organic solvent and is also water insoluble, and wherein the polymer particle has a mean particle size of 75 μm or less; the method comprising steps (1) through (4) below:

(1) a step of obtaining a solution A by dissolving a polymer that is soluble in an organic solvent, and that is also insoluble in water, in an organic solvent in which this polymer is soluble, and then adding a surfactant that is soluble in the organic solvent and further adding a filler to the resulting organic solution;

(2) a step of obtaining a solution B including water, and, optionally, a surfactant;

(3) a step of obtaining an aqueous dispersion containing coarse particles of this polymer containing the filler by combining solution A and solution B optionally with stirring; and (4) a step of processing the coarse particles of the obtained aqueous dispersion to obtain polymer particles having a mean particle size of 75 μm or less.

In an embodiment, the inventive method further comprises a step of adding, at any time, an aqueous solution of water soluble polyamide imide, or polyamic acid or salt thereof.

In an embodiment of the inventive method, the surfactant is a nonionic or anionic surfactant with a decomposition temperature below 430° C.

In an embodiment of the inventive method, the water-insoluble polymer in the aforementioned polymer particle is at least one selected from polyimides, polyamide imides, polyamides, polyesters, polyethylene terephthalate, polyphenylene sulfide, polysulfones, polyetherimides, and polyethersulfones. Preferably, the water insoluble polymer in the polymer particle is selected from polyetherimide or polyether sulfone, or combination thereof. A preferred embodiment of the inventive method uses polyetherimide as the water-insoluble polymer of step 1 in the inventive method, either alone, or in combination with polyethersulfone or polyamide imide. In the latter case, the polyamide imide may be added together with polyetherimide as a water insoluble resin, or it may be added later as a water soluble thickener, for example, as polyamic acid or the salt form thereof.

In an embodiment of the inventive method, the filler particles are organic particles or inorganic particles.

In one such embodiment of the inventive method, the filler in the aforementioned polymer particle is at least one inorganic particle selected from silicon carbide, silicon oxide, aluminum oxide, zinc oxide, tin oxide, titanium dioxide, barium sulfate, and carbon black.

In another embodiment of the present inventive method, the filler of the aforementioned polymer particle is at least one organic particle selected from polyphenylene sulfide, polyetheretherketone, and aramid.

In an embodiment of the inventive method, either the organic solvent of step 1 is a water miscible organic solvent, or a water miscible organic solvent is added at any time during steps 1-4.

In an embodiment of the inventive method, the aqueous dispersion comprises one or more water miscible organic solvent.

In an embodiment of the inventive method, the aqueous dispersion comprises at least one organic solvent selected from acetamide, acetoacetamide, lactone, acetoacetate, pyrrolidone, guanidine, piperidone, dialkylsulfoxide, furfural, organic carbonate, phthalate, sulfolane, dione, and organic phosphate, or a mixture thereof. Preferably, the organic solvent is at least one of dimethylacetamide, dimethylacetoacetamide or N-methyl-2-pyrrolidone.

The present invention makes it possible to provide a polymer particle comprising a polymer that is soluble in an organic solvent and that is also water insoluble, the polymer particle including a filler therein, and having a mean particle size of 75 μm or less; and to provide an aqueous dispersion including this particle; a fluororesin coating composition that uses this aqueous dispersion; and a fluororesin laminate or multi-layer coating having a layer obtained from this fluororesin coating composition.

Additionally, the invention provides a fluororesin laminate which has a layer including a fluororesin coating composition that contains a polymer particle, the polymer of which is soluble in an organic solvent and also water insoluble, and which particle contains a filler therein, and has a mean particle size of 75 μm or less, has non-tackiness while at the same time covering the surface of the filler since the filler is encapsulated within these polymer particles. Therefore, adhesion to metallic substrates and between layers is strengthened, and the infiltration of heat or moisture or corrosives, and the like, caused by the addition of the filler, is suppressed, whereby peeling of the fluororesin laminate can be prevented and excellent corrosion resistance, steam resistance, and durability can be obtained.

The fluororesin laminate can be broadly used in applications including office equipment applications, chemical corrosion prevention, cooking and food processing implements, sliding materials, automotive applications, construction materials, semiconductor production equipment components, and the like.

BRIEF DESCRIPTION OF THE DRAWINGS

1—polymer binder.
2—filler particles.
3—coarse particles of polymer binder containing one or more filler particles.
4—water and surfactant.
5—polymer particle (having a mean particle size of 75 μm or less) comprising a polymer and a filler contained therein.

DETAILED DESCRIPTION

Herein, PTFE is polytetrafluoroethylene; PFA is the copolymer tetrafluoroethylene-fluoroalkoxytrifluoroethylene; and FEP is the copolymer tetrafluoroethylene-hexafluoropropylene.

Herein, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. For example, when a range of "1 to 5" is recited, the recited range should be construed as including ranges "1 to 4", "1 to 3", "1-2", "1-2 & 4-5", "1-3 & 5", and the like. Where a range of numerical values is recited herein, unless otherwise stated, the range is intended to include the endpoints thereof, and all integers and fractions within the range.

The present invention provides a polymer particle having a mean particle size of 75 μm or less that comprises one or more polymer that is soluble in an organic solvent and also water insoluble, and which polymer contains a filler therein.

Examples of the polymer of the present invention that is soluble in an organic solvent and also water insoluble include water insoluble polymers that may be dissolved in a polar solvent, such polymers, for example, as polyimides, polyamide imides (PAI), polyamides, polyesters, polyethylene terephthalate, polyphenylene sulfide, polysulfones, polyetherimides, polyethersulfones, and the like, or a combination thereof. Polyetherimides (PEI) and polyethersulfones (PES), or a combination thereof, are preferable. In a preferred embodiment, the polymer is PEI, which is found to provide superior corrosion resistance and steam resistance properties for fluororesin coatings produced from the inventive polymer particles made by the inventive methods described herein. The PEI may be used alone or in combination with another polymer. PEI is insoluble in water and does not have an equivalent salt form to facilitate using the resin in aqueous systems. Accordingly, PEI is generally not used in aqueous coating compositions. The inventive method presented herein is therefore particularly advantageous in accessing a usable form of PEI in aqueous coating compositions, which provides superior corrosion resistance and steam resistance.

The physical form of the water insoluble polymer can be selected in consideration of solubility in the organic solvent, for example, as a powder, a granular or agglomerated grain, a pellet, or the like. More preferable examples are fine grains having a mean particle size of 0.1 to 1.0 micron, or a powder of a mean particle size from a few microns to a few dozen microns, or pellets. From the perspective of solubility in the organic solvent, as small a mean particle size as possible is preferable, while for sponge forms, porous forms, and the like, a large surface area is preferable.

It is preferable that the mean particle size of the polymer particle of the present invention, which contains a filler therein, is 75 μm or less, or 50 μm or less, or, even, 30 μm or less. If the mean particle size exceeds 75 μm, clumps (polymer aggregates) are likely to occur in the resulting coating. There is no specific limit to the minimum mean particle size for the polymer particles, and it is preferable that the mean particle size is 0.05 μm or greater, more preferably from 0.05 to 75 μm, such as from 0.05 to 50 μm or from 0.05 to 30 μm, and even more preferably from 0.05 to 20 μm. When handled as a powder, a mean particle size of from 0.05 to 75 μm is desirable, and preferably the mean particle size is from 5 to 30 μm.

It is preferable that the organic solvent of the present invention is a polar solvent, such as any one of acetoacetamide, lactone, acetoacetate, pyrrolidone, guanidine, piperidone, dialkylsulfoxide, furfural, organic carbonate, phthalate, sulfolane, dione, and organic phosphate, or a mixture thereof. In an embodiment, the organic solvent may be N-methyl-2-pyrrolidone (hereinafter, NMP). In an embodiment, the organic solvent may be dimethylacetamide (DMAC). In an embodiment, the organic solvent may be dimethylacetoacetamide (DMAA). In another embodiment, the organic solvent may be a lactone, such as, for example, gamma-buyrolactone or epsilon-caprolactone, or a mixture thereof. Preferably, the organic solvent in which the polymer particle is soluble is a water miscible organic solvent. Preferably, the organic solvent is at least one of dimethylacetamide, dimethylacetoacetamide or N-methyl-2-pyrrolidone.

The filler of the present invention is an organic or inorganic particle, which is preferably selected according to the application of the coating, taking the water resistance and chemical resistance thereof, and the like, into consideration. It is preferable that the filler of the present invention does not dissolve in water. Examples of this filler include, as inorganic particles, metal powders, metal oxides (aluminum oxide, zinc oxide, tin oxide, titanium dioxide, and the like), glass beads, glass flakes, glass particles, ceramics, silicon carbide, silicon oxide, calcium fluoride, carbon black, graphite, mica, barium sulfate, and the like; and as organic particles, polymers that are not dissolved in organic solvents, such as PPS (polyphenylene sulfide), PEEK (polyetheretherketone), aramide, and the like. Of these, it is preferable to use silicon oxide, aluminum oxide, zinc oxide, tin oxide, titanium dioxide, silicon carbide, barium sulfate, or the like, as the inorganic filler particles. PPS is a preferred organic filler particle.

It is desirable that the filler of the present invention is heat resistant to at least 200° C., preferably to 300° C. or higher, and does not promote decomposition of the fluororesin. The particle size of these fillers need only be a particle size that can be contained inside the polymer particle of the present invention. Additionally, when the filler is obtained by grinding in a grinding mill, as is described below, because both the filler and the polymer particle will be ground, the mean particle size of the filler that is used is not specifically limited in that case.

For the amount of the filler contained within the polymer particles, from 5 to 500 parts by weight is preferable, relative to 100 parts by weight of the polymer, 30 to 500 parts by weight is more preferable, and 70 to 500, or even 70 to 400, parts by weight is even more preferable.

Since the filler of the present invention is covered (encapsulated) by a polymer that is soluble in organic solvent and also insoluble in water, fillers that normally confer inferior corrosion resistance and steam resistance can yield excellent corrosion resistance, steam resistance, and adhesion to metal substrates because they do not come into direct contact with moisture and the like that has infiltrated into a fluororesin laminate. Additionally, good cohesion between the filler and fluororesin facilitates uniform filler dispersion into the fluororesin laminate.

The polymer particle of the present invention can be obtained by the following steps (1) through (4).
(1) a step of obtaining a solution A by dissolving a polymer that is soluble in an organic solvent, and that is also insoluble in water, in an organic solvent in which this polymer is soluble, and then adding a surfactant that is soluble in the organic solvent and further adding a filler to the resulting organic solution;
(2) a step of obtaining a solution B including water, and, optionally, a surfactant;
(3) a step of obtaining an aqueous dispersion containing coarse particles of this polymer containing filler by combining solution A and solution B optionally with stirring; and
(4) a step of processing the coarse particles of the obtained aqueous dispersion to obtain polymer particles having a mean particle size of 75 μm or less. For example, step 4 may be a step of grinding the obtained aqueous dispersion of coarse particles in a grinding mill.

Solution B, which contains water, obtained in the aforementioned step (2), may also include one or more surfactant in addition to water. It is preferable to use water from which impurities, such as ions and the like have been removed by distillation or ion exchange (deionized water or purified water).

Surfactants that may be contained in solution B may be the same as or different from the surfactant used in step (1).

It is preferable that the surfactant used in the manufacture of the aqueous dispersion of the present invention has a decomposition temperature of less than 430° C., and that it is a surfactant that will leave little residue on the sintered coating film. Examples of this kind of surfactant include nonionic surfactants and anionic surfactants. Examples of nonionic surfactants include para-alkyl phenyl polyethylene glycol ether in which the alkyl groups have from 8 to 10 carbons. Such nonionic surfactants can be selected from commercial products and used, such as, for example, Tergitol™ (Dow Chemical), Leocol™ (Lion Corporation), and the like.

Examples of anionic surfactants include higher fatty acid salts, sulfuric acid ester salts of higher alcohols, sulfuric acid ester salts of liquid fats and oils, phosphoric acid ester salts of aliphatic alcohols, sulfonic acid salts of dibasic fatty acid esters, alkyl aryl sulfonic acid salts, and the like. Preferable examples of these include Na, K, Li, and $NH_4$ salts of polyoxyethylene alkylphenylether ethylene sulfonic acid (for example, n of polyoxyethylene may be from 1 to 6, and alkyl carbons may be from 8 to 11), alkylbenzene sulfonic acid (from 10 to 12 alkyl carbons), dialkyl sulfosuccinic acid (from 8 to 10 alkyl carbons), and the like.

Considering the stability of the resulting aqueous dispersion, it is more preferable that the surfactant of the present invention is a nonionic surfactant.

The aforementioned step (3) results in coarse polymer particles containing one or more filler particles. However, these coarse polymer particles formed by coagulation are brittle and are larger than the mean particle size of 75 μm. The coarse polymer particles are ground to yield polymer particles with a mean particle size of 75 μm or less that contain the filler therein. For example, the aqueous dispersion obtained by step (3) may be processed through a grinding mill or similar method that effects grinding the coarse polymer particles. The grinding method is not specifically restricted, but it is most practical to perform grinding using a grinding mill, such as a ball mill, bead mill, jet mill, or the like. For example, a commercially available wet grinding mill, such as a NETZSCH wet bead mill, can be used as the grinding mill. Alternatively, high shear mixers may also be effective.

Since the polymer particle obtained by the above method is obtained as an aqueous dispersion, the polymer particle can be isolated by separating the polymer particles from the aqueous dispersion. Alternatively, the polymer particles may also be used directly as the aqueous dispersion of the present invention.

The aqueous dispersion of the present invention contains the polymer particle, the polymer of which is soluble in organic solvent and insoluble in water, the polymer particle including a filler therein, and having a mean particle size of 75 μm or less, as well as an organic solvent. The content of polymer particles in the aqueous dispersion may be from 2% to 55%, or from 2% to 45%, or from 3% to 25%, or from 3.0% to 10.0% by weight, or even from 4.5% to 6.5% by weight. If the polymer particle content is too low, it will be necessary to add large quantities of the aqueous dispersion to obtain the fluororesin coating composition, and there is a risk that the aqueous dispersion will have poor stability if the content is too high.

The organic solvents mentioned above can be listed as the organic solvent. Preferably, the organic solvent in the aqueous dispersion is a water-miscible organic solvent. The content of organic solvent in the aqueous dispersion is from 5 to 80% by weight, preferably from 10 to 60% by weight, and more preferably, from 10% to 40% by weight.

This kind of aqueous dispersion may be obtained by preparing an aqueous dispersion using polymer particles, or the aqueous dispersion of polymer particles obtained by the aforementioned steps (1) through (4) can be used. Namely, steps (1) through (4) are also steps to obtain an aqueous dispersion that contains the polymer particle of the present invention and an organic solvent in which the polymer is soluble.

The fluororesin coating composition of the present invention can be obtained by adding fluororesins, surfactants, and optionally other components to the aqueous dispersion of polymer particles of the present invention. The composition can also be obtained by mixing the aqueous dispersion of polymer particles of the present invention described above and an aqueous dispersion of fluororesin, and then optionally adding other desired components.

The surfactant in the fluororesin coating composition of the present invention is preferably present at 1.0% or greater by weight of active component per weight of solids of fluororesin, preferably from 1.5 to 10% by weight, and more preferably from 2.5 to 6% by weight. If an added amount is less than 1.0% by weight, the stabilizing effect on the aqueous dispersion will be low, and an added amount greater than 10% by weight would be economically disadvantageous.

The surfactants described above can be used as the surfactant in the fluororesin coating composition, or others as known in the art may be used.

The fluororesin coating composition of the present invention comprises the polymer particle and a fluororesin.

Examples of the fluororesin of the present invention include polymers and copolymers of unsaturated fluorinated hydrocarbons, unsaturated fluorochlorinated hydrocarbons, unsaturated fluorinated hydrocarbons with an ether group, and the like, or copolymers of these unsaturated fluorinated hydrocarbons and ethylene.

For example, polymers or copolymers of monomers selected from tetrafluoroethlyene, hexafluoropropylene, fluoroalkoxytrifluoroethylene, chlorotrifluoroethylene, vinylidene fluoride, and vinylfluoride, or copolymers of these monomers and ethylene, and the like can be listed. Such fluororesins can be manufactured by commonly known methods, such as solution polymerization, emulsion polymerization, suspension polymerization, and the like.

Examples of these include a homopolymer (PTFE) of tetrafluoroethylene (TFE) as a tetrafluoroethylene homopolymer, and a copolymer of tetrafluoroethylene that contains 1% or less of a comonomer, which is referred to as a modified polymer (modified PTFE), for example, "molding powder", "fine powder", "PTFE micropowder," or "PTFE wax."

PTFE with a melt flow rate (MFR) of from 0.01 to 1.0 g/10 min at 372° C.±1° C., referred to as "PTFE wax," can be directly obtained by decomposing a high-molecular weight PTFE which cannot indicate melt-fluidity, referred to as "molding powder" or "fine powder" with radiation or heat, or by polymerizing tetrafluoroethylene in the presence of a chain transfer agent. Typical manufacturing methods can be referenced, such as in Japanese Examined Patent Application Publication No. S47-19609 or S52-38870 for radiation decomposition, and in U.S. Pat. No. 3,067,262, U.S. Pat. No. 6,060,167, Japanese Examined Patent Application Publication No. S57-22043, or Japanese Unexamined Patent Application Publication No. H7-90024 for direct polymerization.

Copolymers that exhibit fluidity when melted and liquefied at temperatures above the melting point are preferable, examples of which include tetrafluoroethylene-fluoroalkoxytrifluoroethylene copolymers (herein PFA), tetrafluoroethylene-hexafluoropropylene copolymers (herein FEP), tetrafluoroethylene-ethylene copolymers, tetrafluoroethylene-hexafluoropropylene-perfluoro(alkylvinylether) copolymers; as well as polyvinylidene fluoride, polyvinyl fluoride, polychlorotrifluoroethylene, and chlorotrifluoroethylene-ethylene copolymers, or mixtures of two or more of these.

Tetrafluoroethylene-fluoroalkoxytrifluoroethylene copolymers are copolymers of tetrafluoroethylene and a fluoroalkoxytrifluoroethylene represented by formula (1) or formula (2) below, wherein the content of fluoroalkoxytrifluoroethylene in the copolymer is from 1 to 60% by weight.

Compound 1

[1]

Compound 2

[2]

(q is an integer from 0 to 3)

Examples of fluoroalkoxytrifluoroethylenes include perfluoroalkene with 3 or more carbons, preferably from 3 to 6 carbons, perfluoro (alkoxyvinylether) with from 1 to 6 carbons, and the like, and more preferably, perfluoro(methylvinylether) (hereinafter PMVE), perfluoro (ethylvinylether) (hereinafter PEVE), perfluoro (propylvinylether) (hereinafter PPVE), and the like.

Tetrafluoroethylene/perfluoro (alkylvinylether) is preferable as the tetrafluoroethylene-fluoroalkoxytrifluoroethylene copolymer of the present invention.

Additionally, it is preferable that the PFA has a melt flow rate (MFR) at 372° C.±1° C. of from 1 to 100 g/10 min, preferably from 1 to 70 g/10 min, and that it is capable of melt molding.

The PFA can also be used as a mixture of various types of these copolymers with different melt flow rates so that the melt flow rate (MFR) becomes from 1 to 100 g/10 min, preferably from 1 to 70 g/10 min, at 372° C.±1° C.

In addition, a fluororesin particle with a multilayered structure, as disclosed in Japanese Unexamined Patent Application Publication No. 2007-320267, which has a multilayered structure including PTFE and PFA of different melting points, and with at least one internal layer including a fluororesin with a higher melting point than a fluororesin at an outermost layer, may be used as the fluororesin of the present invention.

It is preferable that the fluororesin with a multilayered structure of at least two fluororesins of different melting points include from 90 to 5% by weight of the outermost layer of fluororesin and from 5 to 95% by weight of the inner layer high-melting point fluororesin. The percentages of outermost layer and inner layer can be selected considering the desired chemical resistance, gas permeability, coefficient of linear expansion, maximum strength, and the like. Such fluororesins can be obtained as PFA particles that contain PTFE by, for example, dispersing PTFE particles in a polymerization medium in advance in a PFA polymerization tank, and then initiating PFA polymerization.

The physical form of the fluororesin of the present invention is not specifically restricted. Considering workability, it is preferable that the mean particle size thereof is 75 μm or less. When the fluororesin is handled as a dispersion, it is preferable that the mean particle size is from 0.05 to 75 μm, preferably from 5 to 50 μm; and when handled as a powder, it is preferable that the mean particle size is from 0.05 to 75 μm, preferably from 5 to 40 μm, and more preferably from 5 to 20 μm.

It is preferable that a concentration of fluororesin in the fluororesin coating composition of the present invention is from 5 to 90% by weight, or from 20 to 80% by weight, and preferably from 30 to 70% by weight, based on the weight of solids of the coating composition. If the fluororesin concentration is too high, there is a risk of decreasing adhesion to the substrate material, and if it is too low, there is a risk of decreasing adhesion with other layers that contain fluororesin.

A fluororesin laminate having a layer made from the fluororesin coating composition including the polymer particles of the present invention can be obtained by applying the aforementioned fluororesin coating composition to a substrate of metal, organic resin, inorganic material, or the like by various methods such as, for example, spray coating, dip coating, doctor blade application, gravure coating, screen printing, or the like, and then performing heat treatment at from 200 to 450° C.

The fluororesin laminate having a layer made from the fluororesin coating composition including the polymer particles of the present invention has excellent corrosion resistance, steam resistance, and adhesion to metal substrates. This is due to the fluororesin laminate being non-tacky and at the same time including the polymer particles which contain the filler (the filler is encapsulated by the polymer particle), whereby the filler, which normally confers inferior corrosion resistance and steam resistance, is kept from directly contacting moisture and the like that infiltrates the fluororesin laminate. Furthermore, the polymer component of the polymer particle provides good adhesion to the substrate. The inventive fluororesin coating compositions described herein are particularly useful as primers on metal substrates such as, for example, aluminum or stainless steel.

It is also possible to use a layer made from the fluororesin coating composition including polymer particles of the present invention as a single top coat layer. Alternatively, this layer can be used as a primer layer within the fluororesin laminate. Therefore, the fluororesin laminate can be broadly used in applications including office equipment applications, chemical corrosion prevention, cooking and food processing implements, sliding materials, automotive applications, construction materials, semiconductor production equipment components, and the like.

EXAMPLES

The present invention will be described in further detail below by presenting examples and comparison examples, but the present invention is not limited to these examples.

Raw Materials
1. Polyetherimide (PEI)
   Ultem 1000 Pellets (Sabic Innovative Plastics)
2. Polyethersulfone (PES)
   ULTRASON (E-2020, BASF)
3. Polyphenylene sulfide (PPS)
   PQ-208 (DIC Corporation, mean particle size 12 μm)
4. Barium sulfate
   Blanc Fixe Micro (Sachtleben, mean particle size 0.8 μm)
5. Aluminium oxide
   SGA-16, (Almatis Co., mean particle size 0.4 μm)
6. Titanium dioxide
   TI-Pure R-900-28, (DuPont Titanium Technologies, mean particle size 1.0 μm)
7. Carbon black
   MPC Channel Black (Keystone Aniline)
8. Water soluble PAI
   HPC-1000-28 (Hitachi Chemical)
9. Thickener
   Metolose 65SH (Shin-Etsu Chemical Co., Ltd.)
10. PTFE
    60% by weight PTFE aqueous dispersion
    (34-JR, DuPont-Mitsui Fluorochemicals Co., Ltd., mean particle size 0.2 μm)
11. PFA 1
    60% by weight PFA aqueous dispersion
    (334-JR, DuPont-Mitsui Fluorochemicals Co., Ltd., mean particle size 0.2 μm)
12. PFA 2
    PFA powder
    (MP-102, DuPont-Mitsui Fluorochemicals Co., Ltd., mean particle size 20 μm)
13. Surfactant
    Tergitol™ TMN-10
    Surfactant solution is 90% active ingredient (Dow Chemical Co.)

Example Embodiments 1 Through 16 and Comparison Examples 1 Through 7

Preparation of Aqueous Dispersion

Aqueous dispersions No. 1 through No. 14 as shown in Table 1 were prepared by the method shown below. The proportions of the components listed in table 1 are proportions by weight. (The quantity of surfactant shown in Table 1 is the total quantity used in both solution A and solution B and the quantity added is a 90% active ingredient sample).

(1) Polymers that are soluble in organic solvent, as shown in Table 1 below, were dissolved in organic solvents, as shown in Table 1, to yield organic solutions. A surfactant (Tergitol™ TMN-10, Dow Chemical Co.) dissolved in an organic solvent was added and dissolved in the resulting organic solutions, to which the fillers shown in Table 1 were further admixed, to form a solution A;

(2) the same surfactant was added to and dissolved in purified water to yield an aqueous solution of surfactant, to form a solution B;

(3) while stirring solution B, solution A was poured into solution B, causing the polymer/filler mixture to coagulate, and yielding an aqueous dispersion including coarse particles of organic solvent soluble (water insoluble) polymer that contain filler;

(4) the coarse particles of water insoluble polymer in this aqueous dispersion were ground by processing with a grinding mill to yield an aqueous dispersion of water insoluble polymer particles that contain filler, wherein the particles are reduced in size to obtain polymer particles having a mean particle size of 75 μm or less, as described below.

For aqueous dispersions No. 15 through No. 17 shown in Table 1 below, water soluble PAI was used for the organic solvent soluble polymers, as comparative examples. Aqueous dispersions were prepared by the method shown below.

(1) A polymer soluble in organic solvent (water soluble PAI), as shown in Table 1 below, was dissolved in an organic solvent, as shown in Table 1, to yield an organic solution. A surfactant (Tergitol™ TMN-10, Dow Chemical Co.) dissolved in an organic solvent was added and dissolved in the resulting organic solution, to which the fillers shown in Table 1 were further admixed to obtain a mixed solution, as a solution A;

(2) this surfactant was added to and dissolved in purified water to yield an aqueous solution of surfactant, as a solution B;

(3) while stirring solution B, solution A was poured into solution B to yield an aqueous dispersion.

At this moment, the water soluble PAI is dissolved in a solvent including water, without coagulating or hardening.

For aqueous dispersions No. 18 through No. 20 shown in Table 1 below, the filler was added after the polymer particles were generated. The preparation method is shown below.

(1) A polymer soluble in organic solvent, as shown in Table 1 below, was dissolved in an organic solvent, as shown in Table 1, to yield an organic solution. A surfactant (Tergitol™ TMN-10, Dow Chemical Co.) dissolved in an organic solvent was added and dissolved in the resulting organic solution to obtain a mixed solution, as a solution A;

(2) this surfactant was added to and dissolved in purified water to yield an aqueous solution of surfactant, as a solution B;

(3) while stirring solution B, solution A was poured into solution B, causing the polymer to coagulate, and yielding an aqueous dispersion including coarse particles of organic solvent soluble (water insoluble) polymer that contained no filler;

(4) the coarse particles of water insoluble polymer in this aqueous dispersion were ground by processing with a grinding mill to yield an aqueous dispersion of water insoluble polymer particles;
(5) the filler shown in Table 1 was then added and stirred to obtain an aqueous dispersion.

In the polymer particles in the obtained aqueous dispersions (aqueous dispersions No. 18-20), the filler was not encapsulated by the polymer particle.

Figure 1:
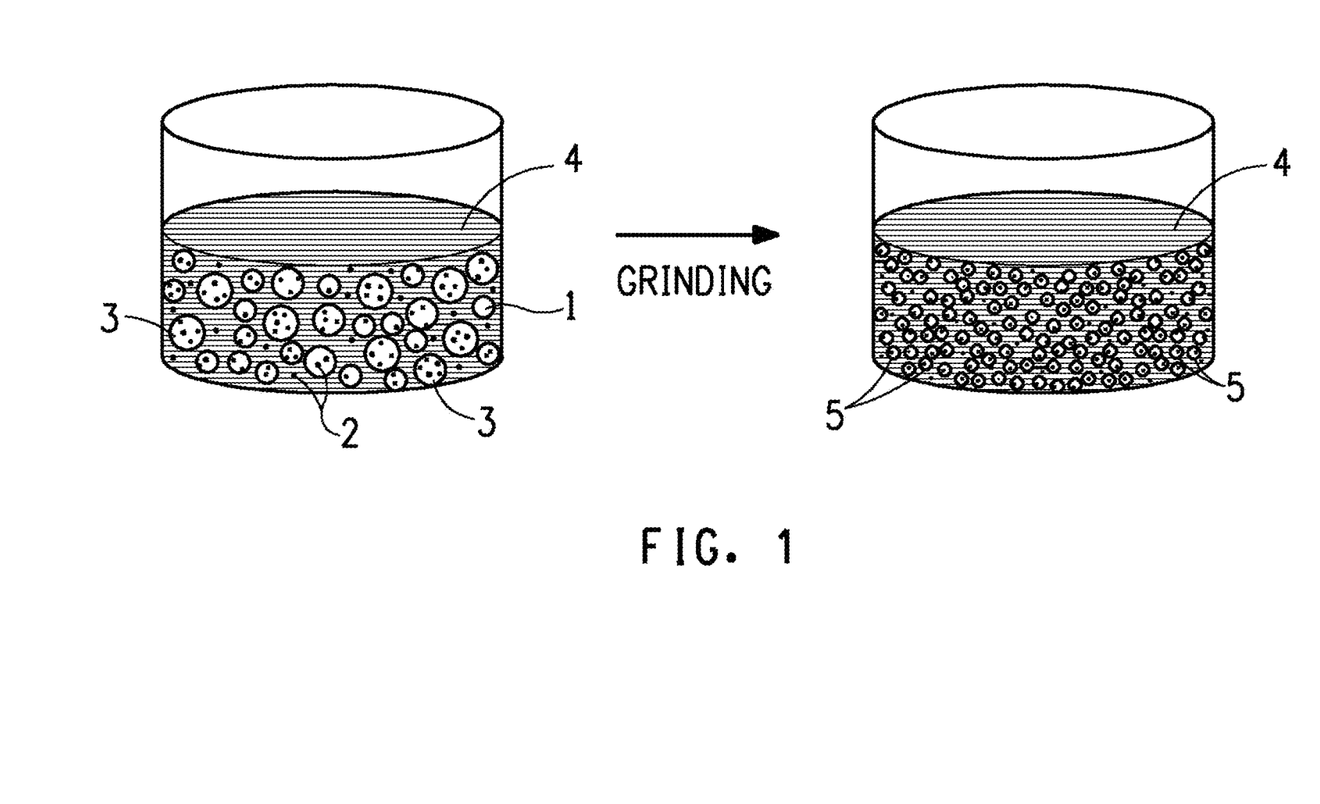
FIG. 1 is a schematic diagram that shows the change in dispersion components in the process whereby an aqueous dispersion including the coarse polymer particles obtained by step (3) of the present invention is ground to obtain an aqueous dispersion including the polymer particle of the present invention having a mean particle size of 75 μm or less. For FIG. 1, the following labels apply.
Figure 2:
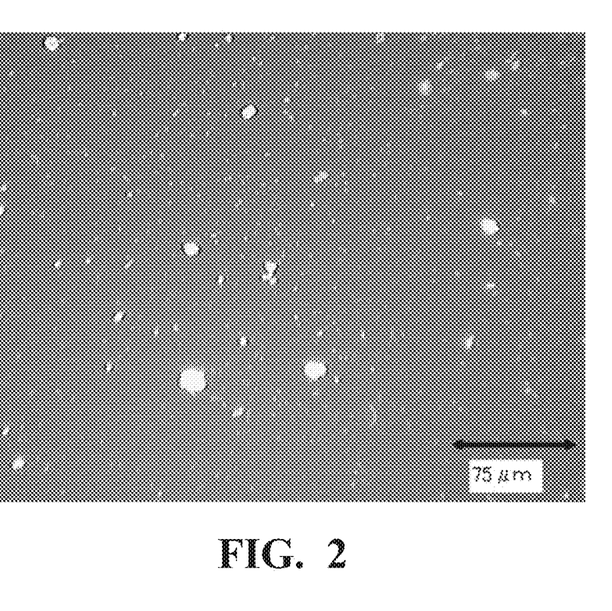
FIG. 2 is a microphotograph of aqueous dispersion No. 1 according to an example.
Figure 3:
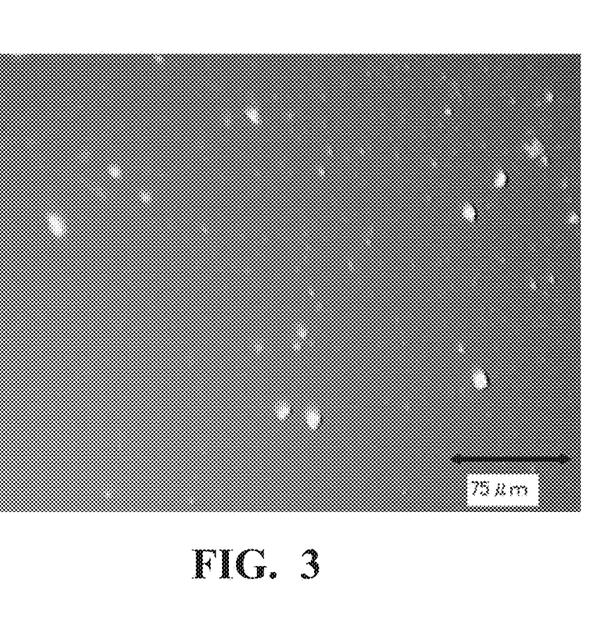
FIG. 3 is a microphotograph of aqueous dispersion No. 4 according to an example.
Figure 4:
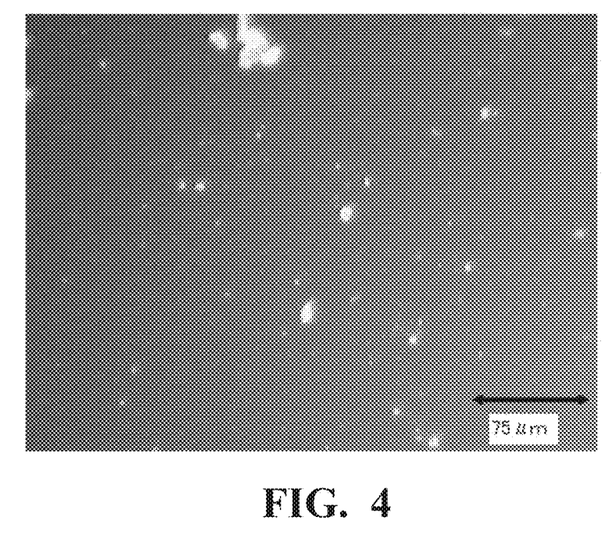
FIG. 4 is a microphotograph of aqueous dispersion No. 5 according to an example.
Figure 5:
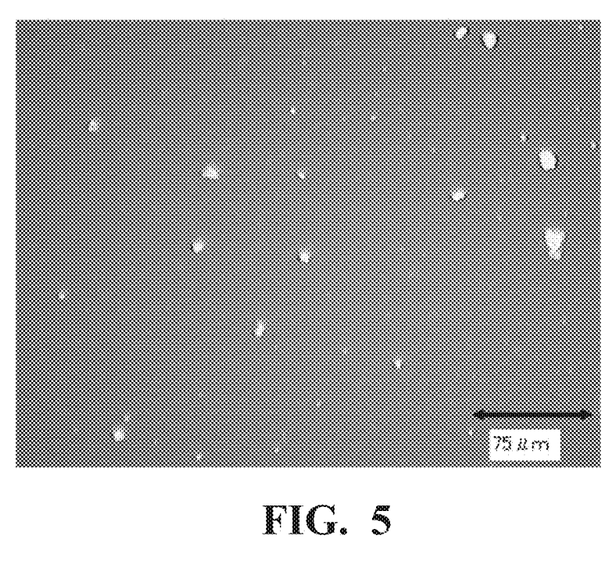
FIG. 5 is a microphotograph of aqueous dispersion No. 6 according to an example.
Figure 6:
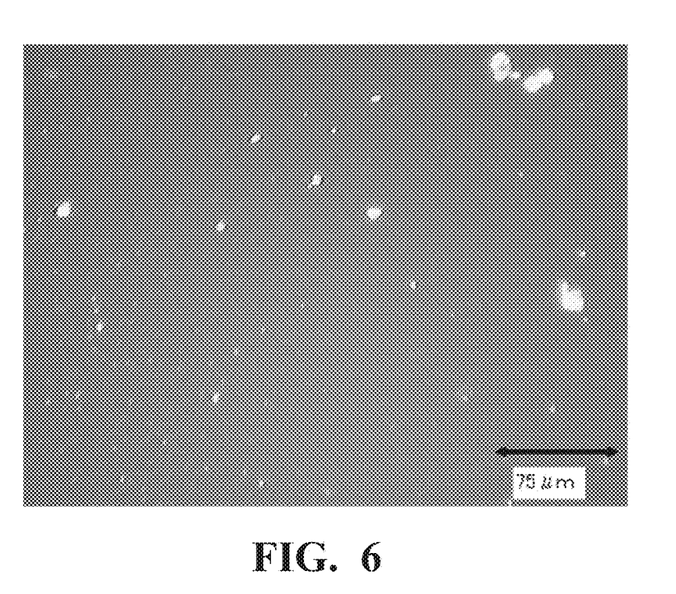
FIG. 6 is a microphotograph of aqueous dispersion No. 13 according to an example.
Figure 7:
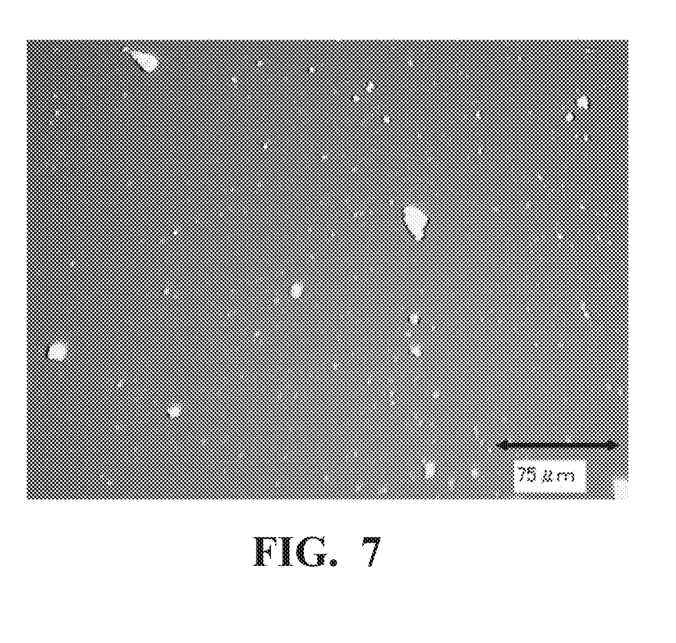
FIG. 7 is a microphotograph of aqueous dispersion No. 14 according to an example.
Figure 8:
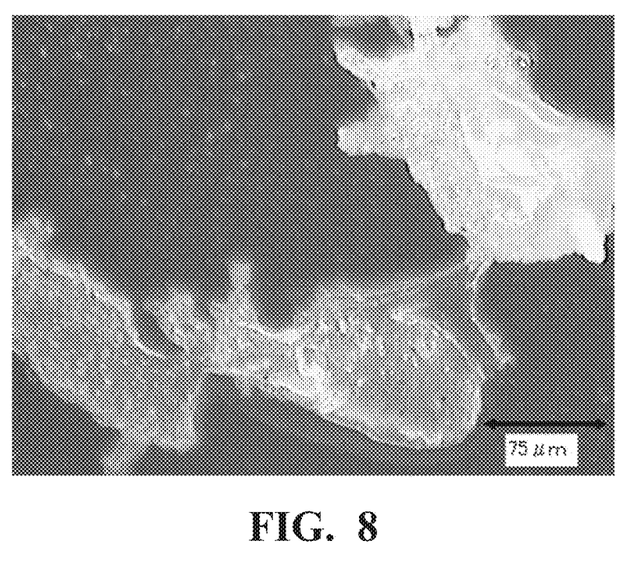
FIG. 8 is a microphotograph of the dispersion before grinding of aqueous dispersion No. 9.
Figure 9:
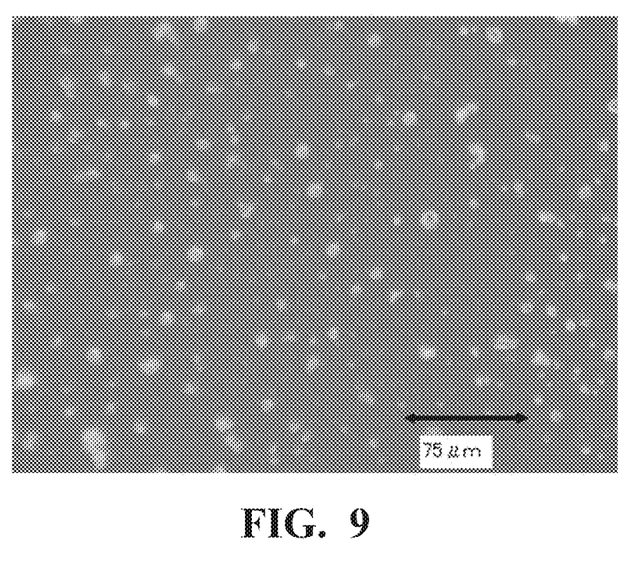
FIG. 9 is a microphotograph of the dispersion after grinding of aqueous dispersion No. 9.

The mean particle size of the inventive water insoluble polymer particles including filler was measured. With respect to the procedure, first, measurement samples were prepared by diluting the polymer particle aqueous dispersion 50-times with water, which was then cast on a glass slide that had been heated to 200° C. Next, the resulting measurement sample was observed at 50-times or 100-times magnification using an optical microscope (Hirox-Japan Co., Microscope KH-1300). Photographs that were taken of aqueous dispersions No. 1, No. 4, No. 5, No. 6, No. 13, and No. 14 shown in Table 1 below are shown in FIGS. 2 through 7. Photographs that were taken of aqueous dispersion No. 9, for respective dispersions before and after grinding, are shown in FIGS. 8 and 9. The mean particle size for aqueous dispersions No. 1 through No. 9 was calculated using the method described below. The results are shown in Table 2. After grinding, the mean particle size of the polymer particle was less than 75 μm.

The obtained aqueous dispersions No. 1 through No. 14 included particles wherein the polymer particles contained the filler (the filler was encapsulated by the polymer). For aqueous dispersions No. 15 through No. 17, because water soluble PAI was used as the organic solvent soluble polymer, the polymer remained in a dissolved state without coagulating, even if water was added (the filler within the polymer was dispersed). For aqueous dispersions No. 18 through No. 20, because the filler was added after the polymer particles were coagulated and formed, the filler was not encapsulated by the polymer.

TABLE 2

Average Particle Size of Polymer Particles in Aqueous Dispersions

| Aqueous Dispersion No. | Average Particle Size (μm) |
|---|---|
| No. 1 | 21 |
| No. 9 (after grinding) | 10 |
| No. 9 (before grinding) | 186 |

Preparation of Fluororesin Coating Composition

The quantities of purified water and water-soluble PAI ("Thickener PAI") shown in Table 3 were added to the aqueous dispersions obtained above, and then stirred for 20 minutes at 140 rpm using a stirrer (Yamato Scientific Co.) Then, a thickener (Metolose 65SH, hydroxypropyl methylcellulose) was mixed with purified water and dissolved to make a 6% by weight aqueous solution, and the thickener aqueous solution was added in the amounts shown in Table 3, and then stirred for another 20 minutes. Finally, the aqueous dispersion of fluororesins shown in Table 3 (PFA-1 Dispersion and PTFE Dispersion) were added and stirred for 10 minutes to yield fluororesin compositions, which were then used as primer compositions (described below).

Test Piece Preparation 170 mm×170 mm aluminum (A1050) was used as a substrate and shot-blasted with #60 alumina. Subsequently, a fluororesin composition was spray coated using a liquid spray gun (W-101-101G, Anest Iwata Co.), and then dried for 20 minutes at 120° C. to form a primer layer.

Next, a powder coating spray gun (Parker Ionics Co., GX355HW) was used to electrostatically powder-coat PFA2 (PFA powder, MP-102) onto the primer layer, which was then sintered for 30 minutes at 390° C. (substrate temperature) to form a top coat layer, yielding a fluororesin laminate. The resulting fluororesin laminate was taken as the test piece.

The methods of measuring physical properties were as follows.

TABLE 1

Aqueous Dispersions of Binder Polymer and Filler

| | Aqueous dispersion | Organic solvents soluble polymer | | | | | | Filler | | | | | | |
| | | PEI | PES | Water-soluble PAI | Organic solvent DMAC | NMP | PPS | BaSO$_4$ | Al$_2$O$_3$ | TiO$_2$ | Carbon black | Water | Surfactant | Total |
|---|---|---|---|---|---|---|---|---|---|---|---|---|---|---|
| Example | No. 1 | 7.0 | | | | 35.0 | 3.0 | | | | 1.0 | 36.0 | 18.0 | 100.0 |
| | No. 2 | 7.0 | | | | 35.0 | | 3.0 | | | 1.0 | 36.0 | 18.0 | 100.0 |
| | No. 3 | 7.0 | | | | 35.0 | | | 3.0 | | 1.0 | 36.0 | 18.0 | 100.0 |
| | No. 4 | 7.0 | | | | 35.0 | | | | 3.0 | 1.0 | 36.0 | 18.0 | 100.0 |
| | No. 5 | | 7.0 | | | 35.0 | | 3.0 | | | 1.0 | 36.0 | 18.0 | 100.0 |
| | No. 6 | | 7.0 | | | 35.0 | | | 3.0 | | 1.0 | 36.0 | 18.0 | 100.0 |
| | No. 7 | | 7.0 | | | 35.0 | | | | 3.0 | 1.0 | 36.0 | 18.0 | 100.0 |
| | No. 8 | 4.4 | | | | 38.7 | | 4.4 | | | 1.5 | 35.7 | 15.3 | 100.0 |
| | No. 9 | 4.4 | | | | 38.7 | | | 4.4 | | 1.5 | 35.7 | 15.3 | 100.0 |
| | No. 10 | 4.4 | | | 38.7 | | | | 4.4 | | 1.5 | 35.7 | 15.3 | 100.0 |
| | No. 11 | 4.4 | | | | 38.7 | | | | 4.4 | 1.5 | 35.7 | 15.3 | 100.0 |
| | No. 12 | 2.2 | 2.2 | | | 38.7 | | 4.4 | | | 1.5 | 35.7 | 15.3 | 100.0 |
| | No. 13 | 2.2 | 2.2 | | | 38.7 | | | 4.4 | | 1.5 | 35.7 | 15.3 | 100.0 |
| | No. 14 | 2.2 | 2.2 | | | 38.7 | | | | 4.4 | 1.5 | 35.7 | 15.3 | 100.0 |
| Comparative example | No. 15 | | | 21.0 | | 10.0 | | 9.0 | | | 3.0 | 47.0 | 10.0 | 100.0 |
| | No. 16 | | | 21.0 | | 10.0 | | | 9.0 | | 3.0 | 47.0 | 10.0 | 100.0 |
| | No. 17 | | | 21.0 | | 10.0 | | | | 9.0 | 3.0 | 47.0 | 10.0 | 100.0 |
| | No. 18 | 4.4 | | | | 38.7 | | 4.4 | | | 1.5 | 35.7 | 15.3 | 100.0 |
| | No. 19 | 4.4 | | | | 38.7 | | | 4.4 | | 1.5 | 35.7 | 15.3 | 100.0 |
| | No. 20 | 4.4 | | | | 38.7 | | | | 4.4 | 1.5 | 35.7 | 15.3 | 100.0 |

(1) Mean Particle Size

Measurement samples were prepared by diluting the polymer particle aqueous dispersion 50-times with water, which was then cast on a glass slide that had been heated to 200 degrees. Next, the resulting measurement sample was photographed at 50-times or 100-times magnification using an optical microscope, and respective particle diameters (unidirectional diameter) in one direction were measured using the obtained photograph. The volume mean diameter was calculated using these particle diameters (unidirectional diameter), treating each particle as a hypothetical sphere, and this was taken as the mean particle size of the polymer particles.

(2) Steam Resistance

A test piece was left in 170° C., 0.8 MPa water vapor for 50 hours, after which it was allowed to slowly cool to room temperature, and then observed for the presence of blisters (blister-like swelling), corrosion, and peeling. After similarly leaving the test piece for another 50 hours and allowing it to cool, it was observed for corrosion and peeling.

The back surface of the test piece (uncoated surface) was then heated to 190° C. over the open flame of a range, after which, it was quenched by immersion in water, and then observed for blisters (blister-like swelling), corrosion, and peeling. With this as one cycle, the test piece surface was checked for blisters (blister-like swelling), corrosion, peeling, and the like every 100 hours for 300 hours.

(3) Corrosion Resistance

A test piece was left in 170° C., 0.8 MPa water vapor for 50 hours, after which it was allowed to slowly cool to room temperature. Afterward, 20 g of "Oden no Moto" [Japanese soup stock] (S & B Foods Inc.) was dissolved in 1 liter of water, a test piece was immersed in this solution, held at from 90 to 100° C., and observed once a week for 4 weeks for the occurrence of peeling, blisters (blister-like swelling), and the presence of corrosion.

(4) Adhesion

The adhesion test piece described below was prepared and adhesion was measured.

Adhesion Test Piece Preparation 50 mm×100 mm aluminum (A1050) was used as a substrate, approximately 10 mm of one side was masked, and then shot-blasted with #60 alumina.

Afterward, a fluororesin composition was spray coated using a spray gun (W-101-101G, Anest Iwata Co.), and then dried for 20 minutes at 120° C. to form a primer layer, and then the masking tape was peeled off, and a powder spray gun (Parker Ionics Co., GX355HW) was used to electrostatically powder-coat PFA2 (PFA powder, MP-102) onto the primer layer, which was then sintered for 30 minutes at 390° C. (substrate temperature) to form a top coat layer. The resulting fluororesin laminate was taken as an adhesion test piece.

Measurement of Adhesion

A laminate formed to a 10 mm width in the direction of the short side was cut off, a masked portion (fluororesin laminate portion without a primer layer) was peeled away in the masked portion in the direction of a fluororesin laminate portion with a primer layer, and the peeled masked portion (fluororesin laminate portion without a primer layer) was protected with masking tape.

The adhesion of the fluororesin laminate portion with a primer layer was measured using a Tensilon Universal Tester (A&D Co.) by clamping the portion protected by masking tape in the chuck of the tester and pulling at a rate of 50 mm/min, according to the adhesive peeling strength (90-degree peeling test) measurement method stipulated in JIS K6854. The unit was kgf/cm.

Various test pieces were prepared using the primer compositions of the compositions shown in Table 3, and the steam resistance, corrosion resistance, and adhesion were measured for the resulting test pieces. Regarding adhesion, the samples were also measured after the Steam Resistance Test ("Adhesion after SRT", in Table 4). The results are shown in Table 4.

TABLE 3

Aqueous Fluororesin Coating Compositions

| | | Aqueous dispersion (g) | | Water (g) | Water-soluble PAI (g) | Thickener (Viscosity improver) (g) | PFA-1 dispersion (g) | PTFE dispersion (g) |
|---|---|---|---|---|---|---|---|---|
| | | (No.) | Polymer particle | | | | | |
| Examples | 1 | No. 1 | Encapsulated | 300 | 48 | | 59.3 | | 111.7 |
| | 2 | No. 2 | Encapsulated | 300 | 48 | | 59.3 | | 111.7 |
| | 3 | No. 3 | Encapsulated | 300 | 48 | | 59.3 | | 111.7 |
| | 4 | No. 4 | Encapsulated | 300 | 48 | | 59.3 | | 111.7 |
| | 5 | No. 5 | Encapsulated | 300 | 48 | | 59.3 | | 111.7 |
| | 6 | No. 6 | Encapsulated | 300 | 48 | | 59.3 | | 111.7 |
| | 7 | No. 7 | Encapsulated | 300 | 48 | | 59.3 | | 111.7 |
| Comparative Example | 1 | No. 15 | Polymer particles | 100 | | | | | 111.7 |
| | 2 | No. 16 | not generated | 100 | | | | | 111.7 |
| | 3 | No. 17 | (due to water-soluble PAI) | 100 | | | | | 111.7 |
| Examples | 8 | No. 8 | Encapsulated | 205 | 50 | 42.9 | 55 | | 111.7 |
| | 9 | No. 9 | Encapsulated | 205 | 50 | 42.9 | 55 | | 111.7 |
| | 10 | No. 10 | Encapsulated | 205 | 50 | 42.9 | 55 | | 111.7 |
| | 11 | No. 11 | Encapsulated | 205 | 50 | 42.9 | 55 | | 111.7 |
| Comparative Example | 4 | No. 18 | Not encapsulated | 205 | 50 | 42.9 | 55 | | 111.7 |
| | 5 | No. 19 | Not encapsulated | 205 | 50 | 42.9 | 55 | | 111.7 |
| | 6 | No. 20 | Not encapsulated | 205 | 50 | 42.9 | 55 | | 111.7 |
| Examples | 12 | No. 12 | Encapsulated | 205 | 50 | 42.9 | 55 | | 111.7 |
| | 13 | No. 13 | Encapsulated | 205 | 50 | 42.9 | 55 | | 111.7 |
| | 14 | No. 14 | Encapsulated | 205 | 50 | 42.9 | 55 | | 111.7 |
| | 15 | No. 9 | Encapsulated | 205 | 50 | 42.9 | 55 | 55.9 | 55.9 |
| | 16 | No. 9 | Encapsulated | 205 | 50 | 42.9 | 55 | 111.7 | |
| Comparative Example | 7 | No. 19 | Not encapsulated | 205 | 50 | 42.9 | 55 | 111.7 | |

TABLE 4

Properties of Fluororesin Coating Compositions on a Substrate

| | | Adhesion (Kg/cm) | | Steam resistance | Corrosion resistance |
|---|---|---|---|---|---|
| | | Initial | Adhesion after SRT | (No blister time) | (No blister time) |
| Examples | 1 | 1 | 0.3 | 100 hour | 40 hour |
| | 2 | >1.5 | 0.6 | 200 hour | 160 hour |
| | 3 | >1.5 | 0.8 | 300 hour | 320 hour |
| | 4 | >1.5 | 0.7 | 300 hour | 160 hour |
| | 5 | >1.5 | 0.4 | 100 hour | 70 hour |
| | 6 | >1.5 | 0.6 | 200 hour | 250 hour |
| | 7 | >1.5 | 0.5 | 300 hour | 70 hour |
| Comparative Example | 1 | >1.5 | 0.1 | less than 50 hour | 40 hour |
| | 2 | >1.5 | 0.1 | less than 50 hour | 40 hour |
| | 3 | >1.5 | 0.1 | less than 50 hour | 40 hour |
| Examples | 8 | >1.5 | 1.1 | 300 hour | 160 hour |
| | 9 | >1.5 | 1.1 | 300 hour | 480 hour |
| | 10 | >1.5 | 1 | 300 hour | 480 hour |
| | 11 | >1.5 | 1 | 200 hour | 320 hour |
| Comparative Example | 4 | >1.5 | 0.9 | 100 hour | 70 hour |
| | 5 | >1.5 | 0.9 | 300 hour | 70 hour |
| | 6 | >1.5 | 0.8 | 300 hour | 70 hour |
| Examples | 12 | >1.5 | 1 | 300 hour | 160 hour |
| | 13 | >1.5 | 1 | 300 hour | 320 hour |
| | 14 | >1.5 | 1 | 200 hour | 320 hour |
| | 15 | >1.5 | 0.7 | 300 hour | 320 hour |
| | 16 | >1.5 | 0.4 | 200 hour | 160 hour |
| Comparative Example | 7 | >1.5 | 0.4 | 200 hour | 160 hour |

The present invention makes it possible to provide a polymer particle, an aqueous dispersion including this polymer particle, a fluororesin coating composition including this aqueous dispersion and a fluororesin, and a fluororesin laminate having a layer made from this fluororesin coating composition.

The polymer particle and aqueous dispersion including the particle provided by the present invention is non-tacky while at the same time having excellent adhesion to substrate materials and between layers, prevents peeling of the fluororesin laminate by suppressing infiltration by heat, moisture, corrosives, and the like, and improves corrosion resistance, steam resistance, and durability.

The present invention provides a fluororesin coating composition that is non-tacky while at the same time having excellent adhesion to substrate materials and between layers, prevents peeling of the fluororesin laminate by suppressing infiltration by heat, moisture, corrosives, and the like, and improves corrosion resistance, steam resistance, and durability.

The fluororesin laminate having a layer made from the fluororesin composition including the aqueous dispersion of the present invention provides excellent corrosion resistance, steam resistance, and adhesion to metal substrates. This is due to the fluororesin laminate being non-tacky and at the same time including the polymer particles which contain the filler (the filler is encapsulated by the polymer particle), whereby the filler, which normally confers inferior corrosion resistance and steam resistance, is kept from directly contacting moisture and the like that infiltrates the fluororesin laminate.

What is claimed is:

1. A polymer particle comprising a polymer and a filler contained therein, wherein the filler is encapsulated by the polymer, wherein the polymer is soluble in an organic solvent and is also water insoluble and comprises a polyimide, polyamide imide, polyamide, polyester, polyethylene terephthalate, polyphenylene sulfide, polysulfone, polyetherimide, or polyethersulfone, and wherein the polymer particle contains from 5 to 500 parts by weight of filler per 100 parts by weight of polymer, and a mean particle size of 75 μm or less.

2. The polymer particle according to claim 1, wherein the filler is an organic particle or inorganic particle.

3. The polymer particle according to claim 2, wherein the inorganic particle is selected from the group consisting of silicon carbide, silicon oxide, aluminum oxide, zinc oxide, tin oxide, titanium dioxide, barium sulfate, and carbon black.

4. The polymer particle according to claim 2, wherein the organic particle is selected from the group consisting of polyphenylene sulfide, polyetheretherketone, and aramid.

5. A polymer particle aqueous dispersion comprising a polymer particle according to claim 1 and an organic solvent in which the polymer of said polymer particle is soluble.

6. The polymer particle aqueous dispersion according to claim 5, wherein the organic solvent in which the polymer of the polymer particle is soluble is any one of acetamide, acetoacetamide, lactone, acetoacetate, pyrrolidone, guanidine, piperidone, dialkylsulfoxide, furfural, organic carbonate, phthalate, sulfolane, dione, and organic phosphate, or a mixture thereof.

7. An aqueous coating composition comprising the polymer particle aqueous dispersion of claim 5.

8. A coating composition comprising a polymer particle according to claim 1 and one or more fluororesin.

9. The coating composition according to claim 8, wherein the fluororesin is a homopolymer of tetrafluoroethylene; a copolymer of tetrafluoroethylene and at least one monomer selected from the group consisting of perfluoro (alkylvinylether), hexafluoropropylene, and ethylene; or a mixture of two or more of these.

10. A fluororesin laminate having a layer comprising a coating composition according to claim 8.

11. A method for manufacturing an aqueous dispersion comprising a polymer particle according to claim 1 wherein the method comprises the following steps (1) through (4):
   (1) a step of obtaining a solution A by dissolving a polymer that is soluble in an organic solvent, and that is also insoluble in water, in an organic solvent in which this polymer is soluble, and then adding a surfactant that is soluble in the organic solvent and further adding a filler to the resulting organic solution;
(2) a step of obtaining a solution B comprising water;
(3) a step of obtaining an aqueous dispersion including coarse particles of this polymer containing filler by combining solution A and solution B optionally with stirring; and
(4) a step of processing the coarse particles of the obtained aqueous dispersion to obtain the polymer particles having a mean particle size of 75 μm or less.

12. The method for manufacturing an aqueous dispersion according to claim 11, wherein the solution B further comprises a surfactant.

13. The method for manufacturing an aqueous dispersion according to claim 11 or 12, wherein the surfactant is a nonionic or anionic surfactant with a decomposition temperature below 430° C.

* * * * *